United States Patent [19]

Leiber et al.

[11] Patent Number: 4,886,140
[45] Date of Patent: Dec. 12, 1989

[54] DEVICE FOR CONTROLLING THE DRIVE TORQUE OF A MOTOR VEHICLE

[75] Inventors: Heinz Leiber, Oberriexingen; Hans-Joachim Ohnemüller, Reutlingen; Klaus Kastner, Stuttgart, all of Fed. Rep. of Germany

[73] Assignee: Daimler Benz AG, Stuttgart, Fed. Rep. of Germany

[21] Appl. No.: 237,382

[22] Filed: Aug. 29, 1988

[30] Foreign Application Priority Data

Aug. 27, 1987 [DE] Fed. Rep. of Germany ....... 3728574

[51] Int. Cl.$^4$ ............................................. B60K 27/00
[52] U.S. Cl. ..................................... 180/197; 123/333
[58] Field of Search ................ 180/197, 170; 123/333, 123/334, 332, 336

[56] References Cited

U.S. PATENT DOCUMENTS 4,637,487 1/1987 Nakamura et al. ................ 280/197

FOREIGN PATENT DOCUMENTS 0229249 11/1986 European Pat. Off. .

Primary Examiner—Charles A. Marmor
Assistant Examiner—Richard Lamb
Attorney, Agent, or Firm—Barnes & Thornburg

[57] ABSTRACT

A device for controlling at least one variable influencing the drive torque of a motor vehicle uses the difference between acceleration of a driven wheel and the vehicle longitudinal acceleration as a control variable. The exceeding of a slip threshold within specific time windows after the driven wheel speed has fallen below the threshold or after increasing the drive torque is used as a check for the correct dosage of drive torque and the slip threshold itself is adjusted depending on the vehicle longitudinal acceleration. This permits an optimum propulsive acceleration and the control device to adapt to changing road conditions.

12 Claims, 2 Drawing Sheets 4,886,140

DEVICE FOR CONTROLLING THE DRIVE TORQUE OF A MOTOR VEHICLE

BACKGROUND AND SUMMARY OF THE INVENTION

The invention relates to a device for controlling at least one variable influencing the drive torque of a motor vehicle using wheel slip and a control variable which is the difference between wheel acceleration and vehicle longitudinal acceleration.

A device having these features is known from EPO 229,249A1. According to this patent, for a vehicle with all-wheel drive, the slip of driven wheel is calculated from the difference between wheel acceleration and vehicle longitudinal acceleration, since non-driven wheels are not present for determining the vehicle speed and hence for the slip of the driven wheels. Control is performed by comparing the slip value calculated with a predetermined threshold value.

Known propulsion control systems generally use the control variables slip or acceleration of driven wheels, control being initiated after a slip threshold is exceeded. It is also known to change the slip threshold, for example when driving in curves or when driving with snow chains, in order to improve the traction or cornering force respectively.

Control is generally activated quickly when the road surface becomes suddenly worse, for example when it changes from dry to wet or icy sections of road. Conversely, this has not been the case until now when conditions suddenly improve, since an increase of the drive torque is made only relatively slowly in order not to enter the next control cycle with too great an excess torque.

It is the object of the invention to create a control device for vehicles with single-axle drive which adapts automatically to changing adhesion coefficients, reacts quickly to rising adhesion coefficients and permits an optimum vehicle acceleration.

This object is achieved as follows.

According to the present invention, the difference between wheel acceleration and vehicle longitudinal acceleration is used as a control variable and compared with a control threshold value. This means that where the vehicle longitudinal acceleration is great, a greater wheel acceleration is necessary in order to activate a control process. As a result, an acceleration process of the vehicle is not essentially hindered by a control process. The slip of the driven wheels serves as a control variable for the effectiveness of the control. The changing of the slip threshold, depending on the vehicle acceleration in conjunction with time windows, and the drive torque increase, depending on the ratio of speed and the current vehicle longitudinal acceleration, allows the control to be rapidly adapted to a so-called micro-jump in the direction of an increasing adhesion coefficient.

By automatically tracking the threshold values for slip and acceleration differences as well as the duration of the time windows, control of the drive torque, which is adaptive and rapidly takes into account the current road conditions, is obtained.

Other objects, advantages and novel features of the present invention will become apparent from the following detailed description of the invention when considered in conjunction with the accompanying drawing.

Diagram A shows the vehicle speed $v_F$, the wheel speed $v_R$ of one of the driven wheels as well as a slip threshold (dashed) derived from the vehicle speed $v_F$.

Diagram B shows the course of the control variable $\Delta b$, which corresponds to the difference between the wheel acceleration of the driven wheel in question and the vehicle longitudinal acceleration $a_x$ and predetermined positive and negative control thresholds $\pm \Delta b_1$ in diagram B. The control variable $\Delta b$, is shown enlarged in the ordinate scale; from this it is also understandable that in diagram A the vehicle speed $v_F$ is shown as a curve with long straight sections, since the rises associated with the acceleration of this curve do not deviate greatly from the straights and the representation is in any case somewhat schematicized.

Diagram C shows the drive torque or the throttle valve angle $\alpha$ and

Diagram D shows the vehicle longitudinal acceleration $a_x$ (likewise enlarged).

Figure 1:
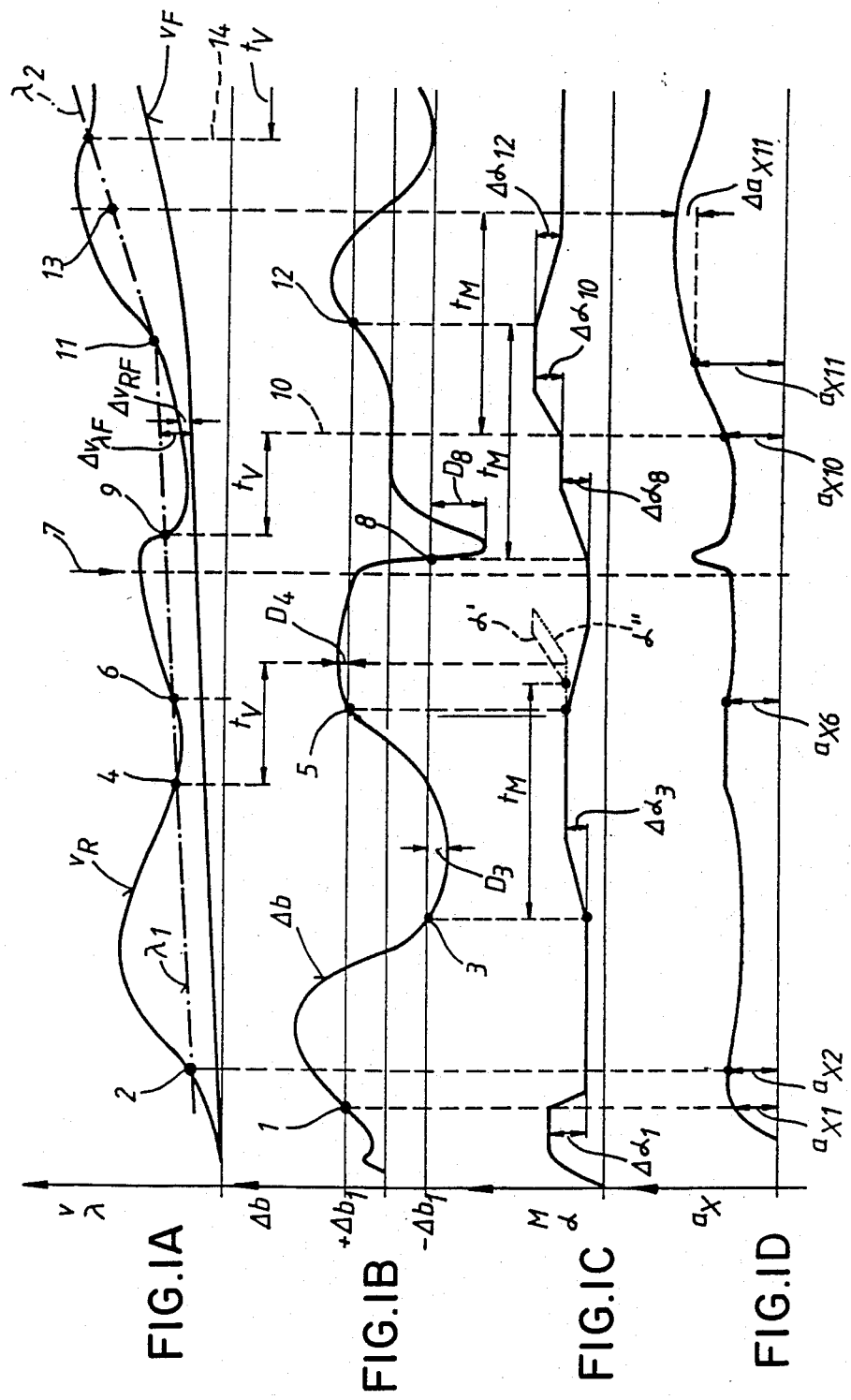
FIG. 1 shows four diagrams, the same time scale being represented on each of the abscissae.
Figure 2:
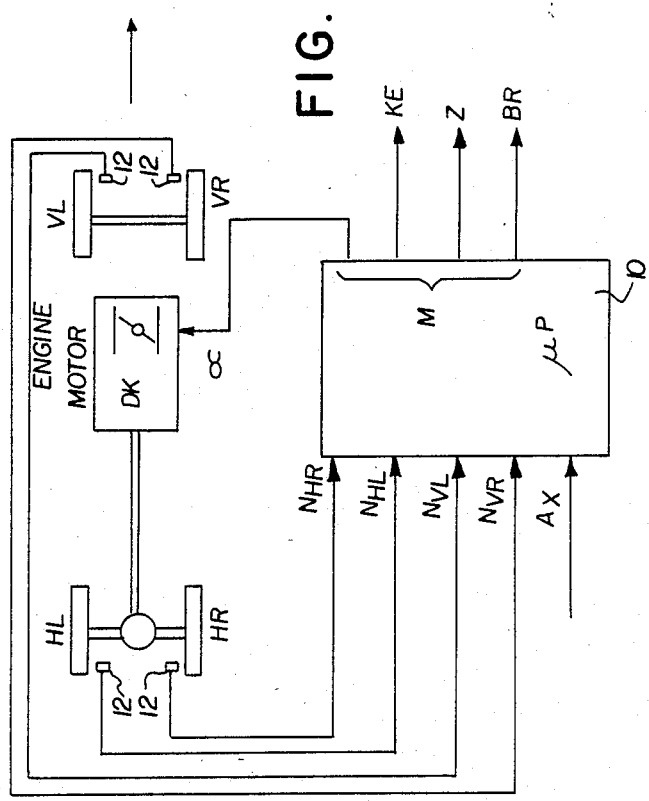

FIG. 2 shows a block diagram of a system capable of operating according to the principles of the present invention.

DETAILED DESCRIPTION OF THE DRAWING

It should be clarified that both engine torque as well as brake torque are to be understood under the concept "drive torque". Variables influencing the drive torque may therefore be, inter alia, throttle valve angle or fuel injection quantity, ignition angle and brake pressure in the wheel brakes. Accordingly, depending on the engine type and presence, variables influencing the engine torque may be divided for example into a fast control loop (ignition angle adjustment) and a slow control loop (adjustment of the throttle valve angle or the fuel injection quantity) matching to remaining influencing variables and combining to a total drive torque being made by an engine characteristic graph, which is, however, not the subject matter of the present patent application. Rising brake pressure in the wheel brakes has the effect of a reduction on the drive torque. When drive torque is being referred to below, this can result from corresponding adjustments of the variables stated, without this being explained in greater detail, since these connections are known per se or are the subject matter of other patent applications.

A propulsion control system of a motor vehicle is described as an exemplary embodiment, in which the drive torque is controlled only by one variable, for example by the throttle valve angle $\alpha$, for the sake of simple representation.

When the vehicle moves off, first of all the accelerator pedal is pressed, whereupon the throttle valve opens, the wheels begin to turn with some time delay and the vehicle subsequently begins to move.

If the accelerator pedal is pressed to far for the current road conditions, too great a drive torque results and at least one driven wheel begins to spin. The difference between the circumferential acceleration of the driven wheel and the vehicle longitudinal acceleration $a_x$, which functions as a control variable $\Delta b$ (diagram B), exceeds at instant 1 a predetermined control threshold $+\Delta b_1$, whereupon the drive torque or the throttle valve angle $\alpha$ in the first control cycle is reduced by a proportion $\Delta\alpha_1$ associated with the vehicle longitudinal acceleration $\Delta a_{x1}$ measured at this moment.

As a result of inertia in the drive line, the excess torque is removed only after a certain time delay, so that first of all the driven wheel continues to rev up and at instant 2, exceeds the dashed slip threshold $\lambda_1$ (diagram A). At this moment, the current vehicle longitudinal acceleration $a_{x2}$ is stored and the further course of acceleration is monitored. If the longitudinal acceleration remains constant or only falls slightly during the monitoring cycle as long as the speed $v_R$ of the driven wheel lies above the slip threshold $\lambda_1$, then the slip threshold remains unchanged, which should be the case in this and in the next monitoring cycle. If the longitudinal acceleration increase however (as shown in the third monitoring cycle), the slip threshold is increased corresponding to this rise to $\lambda_2$. If the longitudinal acceleration decreases more sharply, then the slip threshold is correspondingly lowered, which is however not shown in the drawing.

Due to the reduction of the drive torque at instant 1, the control variable $\Delta b$ is reduced, switches to a delay of the wheel acceleration relative to the vehicle longitudinal acceleration and at instant 3 falls below the negative threshold value $-\Delta b_1$. In accordance with the difference between control variable $\Delta b$ and control threshold value $-\Delta b_1$, the throttle valve angle $\alpha$ or the drive torque M is increased overall by a value $\Delta\alpha_3$. This value $\Delta\alpha_3$, is associated with the difference $D_3$ between the minimum of the control variable $\Delta b$ and control threshold value $-\Delta b_1$ in the manner of a follow-up control.

At the same time as the drive torque increase begins at instant 3, a time window $t_M$ begins to run. If the slip threshold $\lambda_1$ is not exceeded by the driven wheel in question before this time window $t_M$ expires, then after expiration of time (indicated with dashes in diagram C), the drive torque is increased by a predetermined proportion, for example 20%, and the time window $t_M$ is set again ($\alpha'$).

At instant 2, the wheel speed $v_R$ has exceeded the slip threshold $\lambda_1$ and has been reduced again as a result of the reduction of torque at instant 1 after overshooting and runs, as a result of the torque rise at instant 3, at a flat angle into the stable region at instant 4. That is to say it falls below the slip threshold $\lambda_1$.

When the wheel speed falls below the slip threshold, a time window $t_v$ is set, with which the renewed exceeding of this slip threshold within the predetermined time $t_v$ is monitored. As a result of the torque rise at instant 3, the driven wheel accelerates again and exceeds, at instant 5, the positive control threshold value $+\Delta b_1$ and shortly afterwards, at instant 6, the slip threshold $\lambda_1$, so that a torque rise does not come into question either as a result of exceeding the time window $t_M$ (dashed curve $\alpha'$) or as a result of exceeding the time window $t_v$ (dotted curve $\alpha''$).

Instead, due to the control positive threshold $+\Delta b_1$ being exceeded, the torque or the throttle valve angle is reduced in accordance with the difference $D_4$ between maximum of the control variables $\Delta b$ and control threshold value $+\Delta b_1$.

When the slip threshold $\lambda_1$ is exceeded at instant 6, the course of the vehicle longitudinal acceleration $a_x$ (with $a_{x6}$) is monitored analogously as at instant 2, but does not lead, as already described there, to change of the slip threshold in the second monitoring cycle either.

A positive micro-jump now occurs at instant 7 as a result of a change from a wet to a dry roadway for example, indicated by an arrow and a dashed vertical line in the diagrams.

As a result of the better traction, the driven wheel in question is slowed down jerkily and the vehicle is accelerated to the same extent. As a result of the jerky slowing down, a great difference $D_8$ between acceleration difference and control negative threshold is obtained at instant 8, which follows a corresponding increase $\Delta\alpha_8$ of the throttle valve angle.

As a result of the wheel slowing down at instant 9, the value falls below the slip threshold $\lambda_1$ and the time window $t_v$ is set. Due to the improved traction, the wheel is slowed down almost to vehicle speed $v_F$ and requires considerable time to accelerate again despite increasing the drive torque.

In the meantime, however, the time window $t_v$ has expired at instant 10, whereupon an increase in the torque again occurs to an extent associated with the product from the variables measured at instant 10. This product is the vehicle longitudinal acceleration $a_{x10}$ times the ratio of slip threshold $\lambda_1$ minus vehicle speed $v_F (= \Delta b\lambda_F)$ to wheel speed $v_R$ minus wheel speed $v_F$. Accordingly the formula is:

$$\Delta\alpha_{10} \approx a_{x10} \frac{\Delta v_{\lambda F}}{\Delta v_{RF}}$$

Since the ratio of the speed difference is always greater than or equal to one, a corresponding increases of the drive torque associated with this product is obtained, if necessary via a table. As a result of this further increase of the drive torque, when wheel accelerates again and the vehicle acceleration $a_x$ also arises as a result of the now improved traction.

The slip threshold $\lambda_1$ is exceeded again at point 11, before expiration of the time window $t_M$ which is reset for each increase in torque in the manner of a retriggerable monostable mono-flop. The time window $t_M$ is cleared, and the current vehicle longitudinal acceleration $a_{x11}$ is again stored and the further acceleration course is evaluated.

Since, despite an increase of the slip, the vehicle longitudinal acceleration also increases, which is a result of the preceding micro-jump at instant 7, it must be assumed that the previously slip threshold $\lambda_1$ is now too low. Therefore, the slip threshold is increased to a value $\lambda_2$ associated with the difference $\Delta a_{x11}$ between the following maximum of the vehicle longitudinal acceleration and the stored value $a_{x11}$, which is completed at instant 13. This value is then retained until, in a further cycle, a change according to the same criteria is necessary.

Previously, the control variable $\Delta b$ exceeded the positive control threshold $+\Delta b_1$ at instant 12, whereupon the drive torque was reduced by $\Delta\alpha_{12}$ in a manner already described. With the vehicle longitudinal acceleration, which begins at instant 10, the vehicle speed $v_F$ has also increased, which is evident from diagram A by a greater incline of this curve.

As a result of the reduction of the drive torque at instant 12, the wheel slip and control variable are reduced again, so that the value falls below the new slip threshold $\lambda_2$ at instant 14 and consequently the time window $t_v$ is set again.

The principle of the control device has thus been described. The further course of the control follows the course of the described influencing variables.

The above description relates to a simple exemplary embodiment in which, in addition to the drive torque to be controlled, only the slip threshold can be changed adaptively.

This device can be further improved if the control threshold values $\pm \Delta b_1$ of the duration of time windows $t_M$ and $t_v$ are also variable, for example, depending on the vehicle speed or on the difference between control variable and control threshold value or on the level of the slip threshold.

The entire control, encompassing all driven wheels, can take place in a known manner, for example according to the "select low" control method.

A system according to the invention can be represented essentially by one or more correspondingly programmed microprocessors 10 which receive their input signals from sensors 12 at each wheel and emit their output signals n of wheel rotational speed and longitudinal acceleration emits signal ax (not shown) as illustrated in FIG. 2. The microprocessor 10 is programmed to perform the above-described process and produce output signals for total torque m including throttle valve angle α, fuel injection quantity KE, ignition angle Z and braking pressure BR via switching or control amplifiers to electronic throttle DK or injection controls and a likewise electronic ignition point control. It is possible for a person skilled in the art to construct such a system without undue experimentation.

The operations, controls and processes described herein may be performed by a system described in co-pending U.S. Patent Application Ser. No. 136,931 filed Dec. 23, 1987, now U.S. Pat. No. 4,785,904 which is incorporated thus by reference with minor modifications.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Device for controlling at least one variable influencing the drive torque of a motor vehicle, depending on signals of generating means for generating speed and acceleration signals of all driven wheels and of the vehicle and for generating a slip threshold for monitoring the driven wheels and having a control variable which is the difference between wheel acceleration and vehicle longitudinal acceleration comprising:

means for providing a positive control threshold value and a negative control threshold value;

first torque means for reducing the drive torque when the control variable exceeds said positive control threshold value, and for increasing the drive torque when the control variable falls below said negative control threshold value;

slip means for changing the slip threshold in the same direction as the course of the vehicle longitudinal acceleration in response to a driven vehicle wheel exceeded the slip threshold;

a first time window means for providing a first time window which is set by the wheel speed falling below the slip threshold;

a second torque means for increasing the drive torque in addition to said first torque means by a value associated with the product of the current vehicle longitudinal acceleration and the ratio of slip threshold minus vehicle speed to wheel speed minus vehicle speed if the slip threshold is not exceeded again by the driven wheel speed within the first time window after falling below this slip threshold;

a second time window means for providing a second time window which is set, or set again respectively, with each increases of the drive torque; and third torque means for increasing the drive torque in addition to said first torque means if the slip threshold is not exceeded by a driven wheel speed within the second time window.

2. Device according to claim 1, wherein said first torque means reduces or increases the drive torque depending on the maximum difference between control variable and control threshold value occurring after the exceeding or falling below of the positive and negative control threshold value respectively.

3. Device according to claim 1, wherein said slip means does not change the slip threshold in a predetermined range of the course of the vehicle longitudinal acceleration.

4. Device according to claim 1, including control means for changing the positive and negative control threshold value.

5. Device according to claim 4, wherein said control means changes the control threshold values as a function of the vehicle speed.

6. Device according to claim 4, wherein said control means changes the control threshold values as a function of the difference between control variable and control threshold value.

7. Device according to claim 1, including time means for changing the duration of the first and second time windows.

8. Device according to claim 7, including said time means changes the duration of the first and second time windows as a function of the level of the slip threshold.

9. Device according to claim 7, including said time means changes the duration of the first and second time windows as a function of the level of the control threshold values.

10. Device according to claim 7, wherein said time means changes the duration of the first and second time windows as a function of vehicle speed.

11. Device according to claim 7, wherein said time means changes the duration of the first and second time windows as a function of the difference between the control variable and control threshold values.

12. Device according to claim 1, wherein said third torque means increases the drive torque to a predetermined proportion of the current drive torque.

* * * * *